US012762156B2

(12) United States Patent
Agarwal

(10) Patent No.: US 12,762,156 B2
(45) Date of Patent: Oct. 13, 2026

(54) AUTOMATED ENTITY NAME CANONICALIZATION VIA VECTOR TRANSFORMATION USING A DATABASE SYSTEM

(71) Applicant: Salesforce, Inc., San Francisco, CA (US)

(72) Inventor: Devrat Agarwal, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/076,770

(22) Filed: Mar. 11, 2025

(65) Prior Publication Data

US 2026/0277932 A1 Sep. 17, 2026

(51) Int. Cl.

*G06F 16/00* (2019.01)
*G06F 16/22* (2019.01)
*G06F 16/28* (2019.01)

(52) U.S. Cl.

CPC ........ *G06F 16/285* (2019.01); *G06F 16/2237* (2019.01)

(58) Field of Classification Search

CPC .......................... G06F 16/285; G06F 16/2237
USPC ........................................................ 707/739
See application file for complete search history.

(56) References Cited

U.S. PATENT DOCUMENTS

2014/0180676 A1* 6/2014 Hillard .................. G06F 40/295 704/9
2024/0242032 A1* 7/2024 Bay ....................... G06F 18/214
2025/0053587 A1* 2/2025 Coulter ............... G06F 16/2462

* cited by examiner

*Primary Examiner* — Chelcie L Daye
(74) *Attorney, Agent, or Firm* — Kwan & Olynick LLP

(57) ABSTRACT

A computing system may process entity name variations. The entity name variations may be transformed into vector representations. The vector representations may be stored in a database. The entity name variations may be clustered into groups of similar entity name variations based on a similarity metric between the vector representations. A canonical identifier for each group of similar entity name variations may be stored in the database. Each canonical identifier identifying a distinct entity.

20 Claims, 6 Drawing Sheets

AUTOMATED ENTITY NAME CANONICALIZATION VIA VECTOR TRANSFORMATION USING A DATABASE SYSTEM

FIELD OF TECHNOLOGY

This patent document relates generally to on-demand software applications, and more specifically to automated entity name canonicalization via vector transformation using a database system.

BACKGROUND

"Cloud computing" services provide shared resources, applications, and information to computers and other devices upon request. In cloud computing environments, services may be provided by one or more servers accessible over the Internet rather than installing software locally on in-house computer systems. Users may interact with cloud computing services to undertake a wide range of tasks.

For example, such cloud computing services may be implemented via database system associated with large number of entities. Furthermore, distinct entities may have complicatedly varied names.

BRIEF DESCRIPTION OF THE DRAWINGS

The included drawings are for illustrative purposes and serve only to provide examples of possible structures and operations for the disclosed inventive systems, apparatus, methods and computer program products for automated entity name canonicalization via vector transformation using a database system. These drawings in no way limit any changes in form and detail that may be made by one skilled in the art without departing from the spirit and scope of the disclosed implementations.

DETAILED DESCRIPTION

Figure 1:
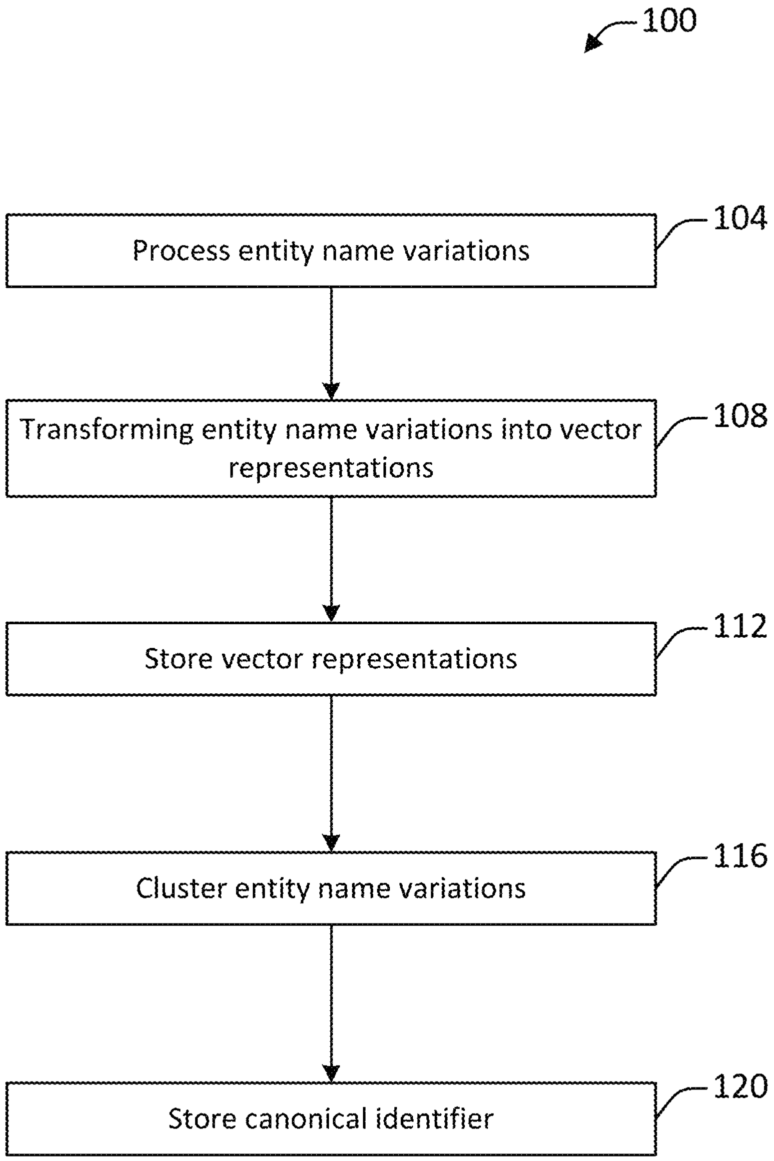
FIG. 1 illustrates an example of a method for automated entity name canonicalization via vector transformation, in accordance with one or more implementations.

Some implementations of the disclosed systems, apparatus, methods, and computer program products are configured for automated entity name canonicalization via vector transformation. Entity name canonicalization enables accurate and efficient identification of entities despite variations in their names (e.g., BofP, Bank of Pemberley, B. Pem., etc.).

While a variety of non-limiting examples are described herein, one having skill in the art may appreciate that the disclosed techniques of semantic matching and grouping under canonical identifiers may be universally applied wherever different naming conventions or abbreviations occur. Accordingly, the disclosed techniques may be flexibly applied across various industries and applications.

Conventional techniques for entity name matching often rely on simple string matching or inconsistent logic, which may lead to inaccurate results when dealing with variations in entity names. By way of example, a banking database contains multiple records for the Bank of Pemberley, but with different name variations such as "Bank of Pemberley", "BoP", "Bank of Pemberly", and "B of P". Unfortunately, conventional techniques fail to accurately match these variations to a single entity, resulting in duplicate records and inconsistent data. For instance, using simple string matching, a query for "Bank of Pemberley" may not return records with the name variation "BoP", even though they refer to the same entity. Similarly, conventional approaches may incorrectly match "BoP" with "Bingley Operations" or other unrelated entities, due to similarities in spelling. Unfortunately, this leads to poor data quality, inaccurate reporting, and inefficient decision-making.

In contrast to conventional methods, the disclosed techniques provide a more accurate and efficient way to match entity names, despite variations in spelling or formatting. By way of illustration, as discussed below, by using vector transformation and clustering algorithms, similar entity name variations may be grouped together, allowing for more accurate and reliable entity identification. Returning to the above example, the disclosed techniques may be applied to the banking database to automatically recognize and match different name variations, such as "BoP", "Bank of Pemberly", and "B of P", to a single canonical entity. Accordingly, data quality is improved, errors are reduced, enabling better decision-making, ultimately leading to improved customer experiences and increased efficiency.

In the context of the above example, conventional techniques may also struggle to handle other variations in entity names, such typos, or differences in spelling. For example, a customer record may contain the name "Bank of Pemberly" due to a typo, while another record contains the correct spelling "Bank of Pemberley". On the other hand, in some implementations, the disclosed techniques may be applied to automatically recognize these variations and match them to a single entity.

In some implementations, the disclosed techniques may be enhanced with continuous learning by periodically updating vector embeddings or retraining models to adapt to new variations, allowing the system to automatically recognize new abbreviations, synonyms, or emerging trends in entity names. Additionally, the disclosed systems may be built to scale horizontally, allowing handling of complex and large datasets, including millions of customer records, real-time transaction data, social media mentions, etc.

Figure 2:
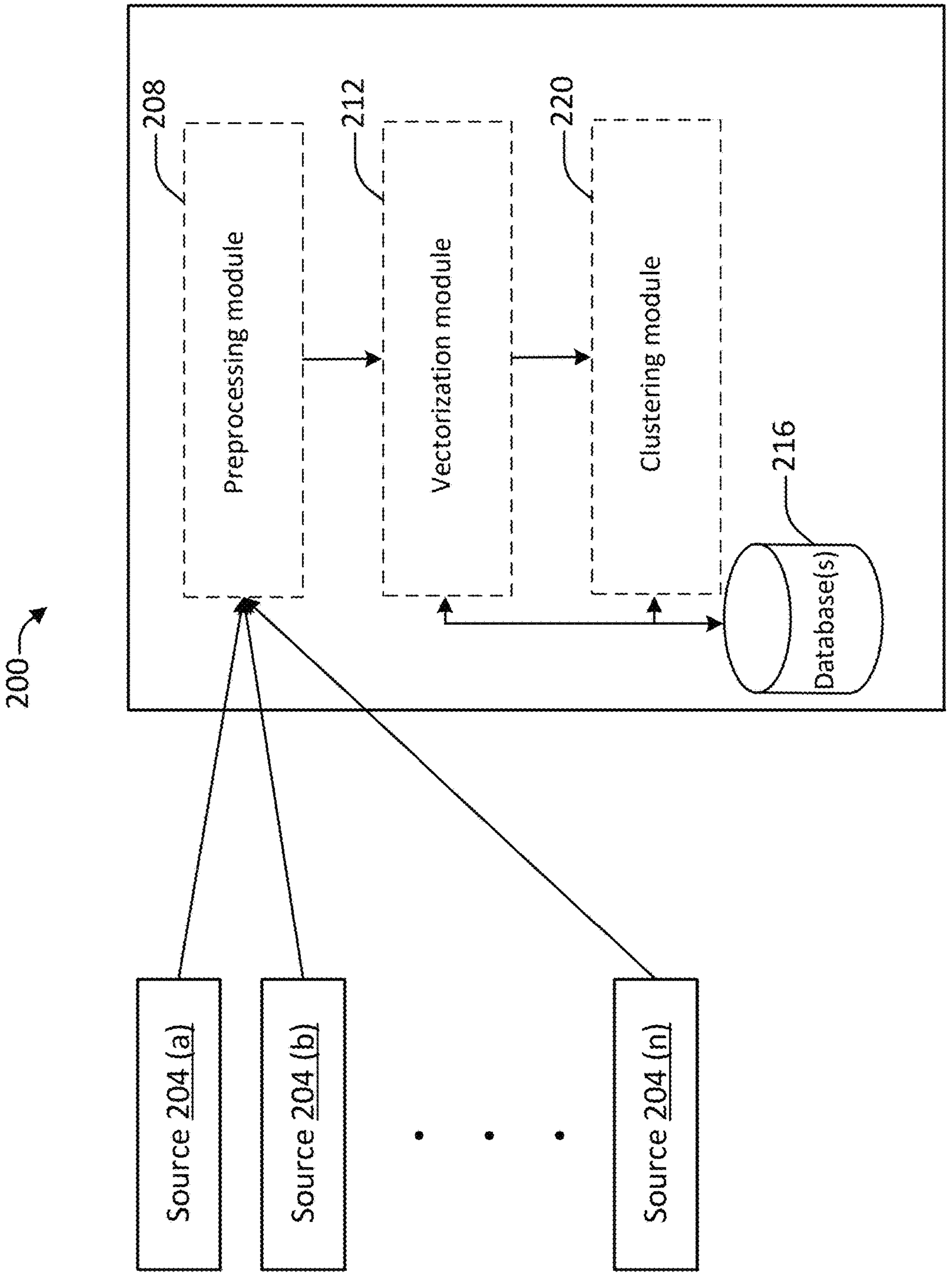
FIG. 2 shows a block diagram of an example of an automated entity name canonicalization system, in accordance with some implementations.
Figure 3:
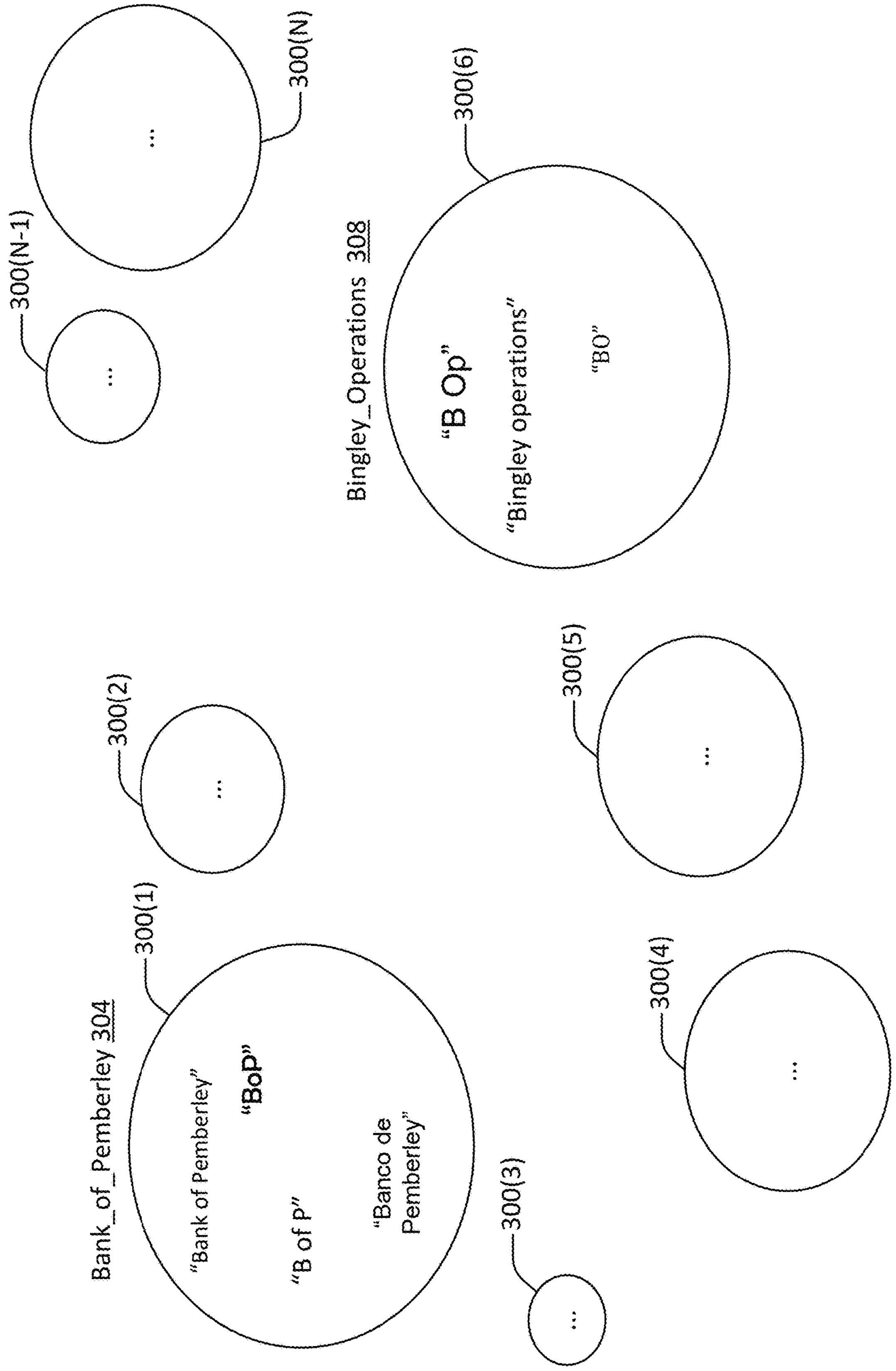
FIG. 3 shows examples of clusters of entity name variations, in accordance with some implementations.

Referring now to the Figures, FIG. 1 illustrates an example of a method for automated entity name canonicalization via vector transformation using a database system, in accordance with some implementations. FIG. 1 is discussed in the context of FIGS. 2 and 3. FIG. 2 shows a block diagram of an example of an automated entity name canonicalization system 200, in accordance with some implementations. FIG. 3 shows examples of clusters 300 of entity name variations, in accordance with some implementations.

At 104 of FIG. 1, a plurality of entity name variations are processed. The entity name variations may be processed using a computing system implemented via a database system. The entity name variations may be gathered from multiple sources, (e.g., source(s) 204(*a*)-(*n*) of FIG. 2. The source(s) 204(*a*)-(*n*) may include any place such as customer records, social media mentions, financial transactions, public databases, and other data sources.

According to various embodiments, gathering entity name variations from multiple sources involves collecting and aggregating data from a variety of channels, including but not limited to customer records, social media mentions, financial transactions, public databases, and other relevant sources. In some implementations, as many entity name variations as possible may be collected in order to ensure that the clustering process described below is robust and accurate.

In various implementations, gathering entity name variations may be achieved through a combination of automated and manual processes. According to various embodiments, automated processes may include web scraping, API calls, or data imports from external sources, while manual processes may involve human annotation or data entry.

In some embodiments, entity name variations may be gathered from customer records, such as customer databases, CRM systems, or sales force automation tools. These records may contain a variety of entity name variations, including names, addresses, phone numbers, and other identifying information.

In some implementations, social media mentions may also be a source of entity name variations. For instance, social media platforms such as X®, Facebook®, or LinkedIn® may contain a large number of entity name variations, including hashtags, handles, and keywords.

Also or alternatively, financial transactions may also provide a wealth of entity name variations. For example, financial transactions such as payments, invoices, or receipts may contain entity name variations, including names, addresses, and other identifying information.

In some embodiments, public databases may also be a used as a source of entity name variations. By way of illustration, public databases such as government records, business registries, or phone books may contain a large number of entity name variations, including names, addresses, and other identifying information.

In some implementations, other relevant sources of entity name variations may include news articles, press releases, or other online content. For instance, such sources may contain entity name variations, including names, keywords, and other identifying information.

In various implementations, the gathered entity name variations may be stored in a centralized database (e.g., database(s) 216 of FIG. 2) or data warehouse for further processing and analysis. This database may be used to store and manage the collected entity name variations, as well as to perform clustering, canonicalization, and other downstream tasks.

In some embodiments, data quality checks may be performed on the gathered entity name variations to ensure that they are accurate and consistent. For example, these checks may include validation against external sources, formatting checks, or other data cleansing processes.

In some implementations, the gathered entity name variations may also be enriched with contextual metadata, such as source information, timestamp, location, or other relevant context. This metadata may help provide a more complete understanding of the entity name variations and their relationships, enabling more effective clustering and canonicalization.

In some implementations, processing the name variations may be executed by preprocessing module 208 of FIG. 2. The preprocessing module 208 may be executed by computing system(s) such as system 600 of FIG. 6.

Processing the name variations may be accomplished in a variety of manners. By way of example, according to various embodiments, processing entity name variations may involve cleaning, normalizing, and transforming text data into a format that may be used for clustering and canonicalization as discussed below. Such processing may remove noise, inconsistencies, and irrelevant information from the entity name variations, while preserving their semantic meaning. For instance, such processing may include removing special characters, normalizing text, handling abbreviations and common misspellings by defining a set of rules or using a dictionary of known abbreviations.

In various implementations, processing entity name variations may include tokenization, e.g., breaking down the entity name variations into individual words or sub words. This may be done using techniques such as word splitting, stemming, or lemmatization.

In some embodiments, stop word removal may also be performed to remove common words like "the", "and", etc. that do not add much value to the semantic meaning of the entity name variations. This may reduce the dimensionality of the text data and improve the efficiency of the clustering process.

In some implementations, processing entity name variations may involve removing special characters, punctuation, and other non-alphanumeric characters from the entity name variations. This may be done using techniques such as regular expressions or string replacement.

In various implementations, processing entity name variations may include handling abbreviations and acronyms by expanding them into their full forms. This may improve the accuracy of the clustering process by reducing the ambiguity associated with abbreviated entity names.

In some embodiments, processing entity name variations may also involve handling misspellings and typos by correcting them or replacing them with their closest matches. This may be done using techniques such as spell checking, edit distance, or phonetic similarity. In some implementations, processing entity name variations may also include normalizing the entity name variations to a standard format, such as lowercase or uppercase letters. This may decrease the impact of case sensitivity on the clustering process and improve the overall consistency of the text data.

Also or alternatively, processing entity name variations may also involve removing irrelevant information, such as phone numbers, addresses, or other numeric data, from the entity name variations. This may help focus the clustering process on the most relevant and meaningful parts of the text data.

In some embodiments, processing entity name variations may also include using techniques like named entity recognition (NER) to identify and extract specific types of entities, such as names, locations, or organizations, from the entity name variations. This may help improve the accuracy of the clustering process by providing more context and meaning to the text data.

In some implementations, processing entity name variations may also involve using techniques like part-of-speech (POS) tagging to identify the grammatical categories of each word in the entity name variations. This may provide more context and meaning to the text data and improve the overall accuracy of the clustering process.

Returning to FIG. 1, at 108, the entity name variations are transformed into vector representations. By way of example, in some implementations, transformation of the entity name variations into vector representations may be executed by vectorization module 212 of FIG. 2. The vectorization module 212 may be executed by computing system(s) such as the system 600 of FIG. 6.

In various implementations, transforming the entity name variations into vector representations may be achieved using techniques such as word embedding or text embedding. For instance, pretrained models like Word2Vec, GloVe, or fastText may be used to map words or phrases into dense vectors based on their semantic context. Custom embeddings may also be trained using models like BERT or SBERT, which may understand semantic meaning at a sentence level.

According to various embodiments, transforming entity name variations into vector representations may be achieved using techniques such as word embedding or text embedding. For instance, this process involves mapping words or phrases into dense vectors based on their semantic context. Pretrained models like Word2Vec, GloVe, or fastText may be used to convert text into high-dimensional vectors that capture semantic meaning.

In various implementations, word embedding techniques may be applied at the token level, where each individual word or sub word is represented as a vector. The vector representation of an entity name variation may be generated by combining the vector representations of its constituent tokens. For example, the vector representation of the entity name "Bank of America" may be obtained by averaging or concatenating the vector representations of the individual words "Bank", "of", and "America".

In some implementations, custom embeddings may be trained using models like BERT or SBERT, which may understand semantic meaning at a sentence level. According to various embodiments, these models may be fine-tuned on specific datasets to generate vector representations that capture domain-specific nuances. For instance, a BERT model may be fine-tuned on a dataset of financial text to generate vector representations that distinguish between different types of financial institutions.

Also or alternatively, since vector-based models like BERT and fastText capture semantic meaning, the disclosed techniques may be adapted to handle multi-language name variations or domain-specific terms. By way of example, "Deutsche Bank®" in German and "Bank of America®" in English may be treated as related entities if needed, leveraging embeddings trained on multilingual or domain-specific data.

In various implementations, the choice of word embedding technique may depend on specific requirements of the application. By way of example, Word2Vec and GloVe may be suitable for applications where the entity name variations are relatively short and simple, while BERT and SBERT may be more effective for applications where the entity name variations are longer and more complex.

In some embodiments, the vector representations may be generated using a combination of different word embedding techniques. For example, the vector representation of an entity name variation may be obtained by concatenating the vector representations generated using Word2Vec and BERT. This approach may help capture both local and global semantic relationships between entity name variations.

In some implementations, the dimensionality of the vector representations may be adjusted based on the specific requirements of the application. Higher-dimensional vector representations may capture more nuanced semantic relationships between entity name variations but may also increase the computational complexity of downstream tasks. Therefore, techniques like PCA or t-SNE may be used to reduce the dimensionality of the vector representations while preserving their semantic meaning.

Returning to FIG. 1, at 112, the vector representations may be stored in a database (e.g., the database(s) 216 of FIG. 2) of the database system. Storing the vector representations in a database may allow for efficient similarity searches and retrieval.

In some implementations, the database may be a vector database, which is optimized for performing similarity searches in high-dimensional spaces. By way of illustration, vector databases like Pinecone, Weaviate, Faiss, and Milvus are optimized for performing similarity searches in high-dimensional spaces, making them more effective for this type of matching compared to traditional databases.

Returning to FIG. 1, at 116, clustering, the entity name variations are clustered into groups of similar entity name variations. By way of example, in some implementations, clustering of the entity name variations may be executed by clustering module 220 of FIG. 2. The clustering module 220 may be executed by computing system(s) such as the system 600 of FIG. 6.

In some implementations, the entity name variations may be clustered based on a similarity metric between the vector representations. For example, clustering entity name variations into groups based on the similarity between their vector representations may be achieved using techniques such as cosine similarity, Euclidean distance, or other distance metrics. Entity name variations that are semantically similar may be grouped together, while those that are dissimilar may be separated.

In various implementations, the clustering process may involve calculating the similarity between each pair of vector representations and then grouping them based on a threshold or a clustering algorithm. As discussed above, cosine similarity may be used for measuring the similarity between vector representations, as it captures the angular distance between vectors in a high-dimensional space.

In some embodiments, the cosine similarity between two vector representations may be calculated using the dot product of the vectors and their magnitudes. For example, given two vector representations A and B, the cosine similarity may be calculated as $\cos(\mathrm{sim}(A, B))=(A\cdot B)/(|A||B|)$, where $A\cdot B$ is the dot product of the vectors and $|A|$ and $|B|$ are their magnitudes.

In some implementations, a threshold may be set to determine whether two entity name variations are similar enough to be grouped together. According to various embodiments, if the cosine similarity between two vector representations is above the threshold, they are considered similar and grouped together under a canonical identifier. For instance, a threshold of 0.8 may be used, meaning that if the cosine similarity between two vector representations is greater than 0.8, they are considered similar. In some implementations, the threshold may be designated and/or user definable.

In various implementations, clustering algorithms such as k-means, hierarchical clustering, or DBSCAN may be used to group entity name variations based on their vector representations. These algorithms may automatically determine the optimal number of clusters and group the entity name variations accordingly.

In some embodiments, the clustering process may be performed in an unsupervised manner, where the algorithm learns to identify patterns and relationships between the vector representations without prior knowledge of the canonical identifiers. This approach may help discover new relationships and patterns in the data that may not be immediately apparent.

Also or alternatively, the clustering process may also be performed in a supervised manner, where the algorithm is trained on labeled data to learn the relationships between the vector representations and the corresponding canonical identifiers. This approach may improve the accuracy of the clustering process and ensure that the entity name variations are grouped correctly.

In various implementations, the quality of the clustering process may be evaluated using metrics such as silhouette score, Calinski-Harabasz index, or Davies-Bouldin index. These metrics may help determine the effectiveness of the clustering algorithm in grouping similar entity name variations together.

In some embodiments, the clustering process may be refined and updated based on feedback from downstream tasks, such as canonicalization or data integration. This approach may help ensure that the clustering process is aligned with the overall goals of the application and that the entity name variations are grouped correctly.

In some implementations, contextual metadata may be used to resolve differences between distinct entities that have the same or similar names. For instance, as discussed above entity name variations may be enriched with contextual metadata such as source information, timestamp, location, or other relevant context. By way of example, Bank of Pemberley is sometimes referred to by an abbreviation of BoP. Similarly Bingley Operations is sometimes referred to by an abbreviation "B Op." Although these abbreviations are similar, Bingley Operations is located in Toronto, Canada and Bank of Pemberley is located in St. Helier Jersey. Therefore, as depicted in FIG. 3, "BoP" may be grouped with other name variations for Bank of Pemberley into cluster 300(1) whereas "B Op" may be grouped with other name variations for Bingley Operations into cluster 300(6).

Returning to FIG. 1, at 120, a canonical identifier is stored for each group of similar entity name variations in the database (e.g., the database(s) 216 of FIG. 2). As discussed above, each canonical identifier may identify a distinct entity. By way of example, in FIG. 3, a canonical identifier "Bank_of_Pemberley" 304 may be assigned to the cluster 300(1) and a canonical identifier "Bingley_Operations" 308 may be assigned to the cluster 300(6).

Assignation of canonical identifiers may vary across implementations. By way of example, the most frequent name in a group (e.g., "Bank of Pemberley") may be assigned as a canonical identifier for the group. Alternatively, a standardized or preferred name may be assigned as a canonical identifier for a group per an organization's specific preferences.

In various implementations, the disclosed techniques may be applied not just to bank names but to any entities that are subject to varying naming conventions, such as service providers, products, or brands. The solution may be adapted to handle multi-language name variations or domain-specific terms, leveraging embeddings trained on multilingual or domain-specific data.

In some implementations, the disclosed techniques may be enhanced with continuous learning by periodically updating the vector embeddings or retraining models to adapt to new variations. This allows the system to automatically recognize new abbreviations, synonyms, or emerging trends in entity names, improving over time as more data is processed.

One having skill in the art may appreciate that the disclosed techniques may be domain-agnostic and may be applied to a wide variety of industries beyond just banking, such as telecommunications, retail, insurance, healthcare, or even public sector entities. The core idea of semantic matching and grouping under canonical identifiers may be universally applied wherever different naming conventions or abbreviations occur.

In some implementations, in the finance industry, the disclosed techniques may be used to improve customer onboarding, risk management, and compliance. For example, a bank may use entity name canonicalization to automatically recognize and match different name variations for a customer, such as "John Smith" and "J. Smith", ensuring that customer records are accurate and up to date. According to various embodiments, this may help reduce the risk of duplicate accounts, improve Know-Your-Customer (KYC) processes, and enable more effective anti-money laundering (AML) monitoring.

In various implementations, in the healthcare industry, the disclosed techniques may be used to improve patient record management, clinical research, and disease surveillance. For instance, a hospital may use the disclosed techniques to automatically recognize and match different name variations for a patient, such as "Jane Doe" and "J. D.", ensuring that medical records are accurate and up to date. According to various embodiments, this may help reduce errors in medical billing, improve patient outcomes, and enable more effective public health monitoring.

In some embodiments, in the retail industry, the disclosed techniques may be used to improve customer relationship management, marketing, and supply chain management. For example, an e-commerce company may use the disclosed techniques to automatically recognize and match different name variations for a customer, such as "John Smith" and "J. Smith", ensuring that customer records are accurate and up to date. According to various embodiments, this may help improve personalized marketing, reduce errors in order fulfillment, and enable more effective inventory management.

In some implementations, in the government sector, the disclosed techniques may be used to improve public safety, law enforcement, and national security. For instance, a law enforcement agency may use the disclosed techniques to automatically recognize and match different name variations for a suspect, such as "John Smith" and "J. Smith", ensuring that records are accurate and up to date. According to various embodiments, this may help improve crime prevention, reduce errors in suspect identification, and enable more effective intelligence gathering.

In various implementations, the disclosed techniques may also be applied to other industries, such as education, non-profit, and media. For example, a university may use the disclosed techniques to improve student record management, while a non-profit organization may use it to improve donor management and fundraising efforts. By way of example, in the context of government, "EY, E&Y, Ernst & Young" could all be clustered within tax auditor data. This may improve data quality and enable more accurate analysis of tax auditor data. For instance, a government tax authority may have multiple datasets containing references to the company name in different formats, such as "EY" in financial reports, "E&Y" in tax returns, and "Ernst & Young" in official documents. By applying the disclosed techniques, a tax authority may automatically recognize and match these variations, grouping them under a single canonical entity, "Ernst & Young", ensuring that all references to the company are accurately linked and analyzed, enabling more effective tracking of tax compliance, auditing, and revenue collection.

In yet another example, according to various embodiments, insurance companies may use the disclosed techniques to group hospital names within insurance claims data, improving data quality and enabling more accurate analysis. For instance, insurance companies often deal with large amounts of claims data that contain variations in hospital names, such as "St. Michael's Hospital" and "Saint Michaels Hosp", which may make it difficult to accurately match and analyze the data.

In some implementations, by applying the disclosed techniques, insurance companies may automatically recognize and match different name variations for a hospital, such as "St. Michael's Hospital", "Saint Michaels Hosp", and "St Michaels Hospital", and group them under a single canonical entity, improving the accuracy of claims processing, reducing errors in billing and reimbursement, and enabling more effective analysis of healthcare trends and costs. The insurance company may also use contextual metadata, such as location or zip code, to resolve differences between distinct hospitals that have the same or similar names. For instance, if there are two hospitals with the name "St. Michael's Hospital" in different locations, the insurance company may use the location information to correctly match each hospital with its corresponding claims data.

According to various embodiments, the disclosed techniques of entity name canonicalization may be used in a university setting to cluster variations of university names, such as "University of Florida", "UoF", and "UF", into a single canonical entity. This may help improve data quality and enable more accurate analysis of student records, alumni databases, and research collaborations. For instance, a university may have multiple datasets containing references to the university name in different formats, such as "University of Florida" in official documents, "UoF" in social media posts, and "UF" in athletic team names. By applying the disclosed techniques, the university may automatically recognize and match these variations, grouping them under a single canonical entity, "University of Florida", ensuring that all references to the university are accurately linked and analyzed, enabling more effective tracking of student outcomes, alumni engagement, and research partnerships, and ultimately supporting informed decision-making and strategic planning. In some implementations, the disclosed techniques of entity name canonicalization may be used to handle the issue of ambiguous abbreviations, such as "USF" being shared by both University of San Francisco and University of South Florida. By using contextual metadata, such as location or geographic information, the disclosed techniques may help disambiguate the abbreviation "USF" and correctly match it to either University of San Francisco or University of South Florida. For example, if a dataset contains mentions of "USF" in conjunction with locations such as "California" or "San Francisco", the disclosed techniques may infer that the reference is to University of San Francisco, whereas if the location is "Florida" or "Tampa", the reference may be inferred to be University of South Florida. By using this approach, the disclosed techniques may accurately cluster and match entity names, even in cases where abbreviations are shared, enabling more effective data analysis and decision-making in applications such as student record management, alumni tracking, and research collaboration.

In various implementations, the models and/or modules described herein may be classification, predictive, generative, conversational, or another form of artificial intelligence (AI) technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a processor or a central processing unit (CPU) coupled to one or more storage system(s), non-transitory machine readable medium (s), memory, or other machine readable storage medium(s).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, a plurality of input prompts may be provided to the AI technology for the purpose of eliciting particular responses. In various implementations, the plurality of input prompts may correspond to the particular field or task to which the AI technology is trained. Additionally, the AI technology may be implemented along with a plurality of additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

Figure 4:
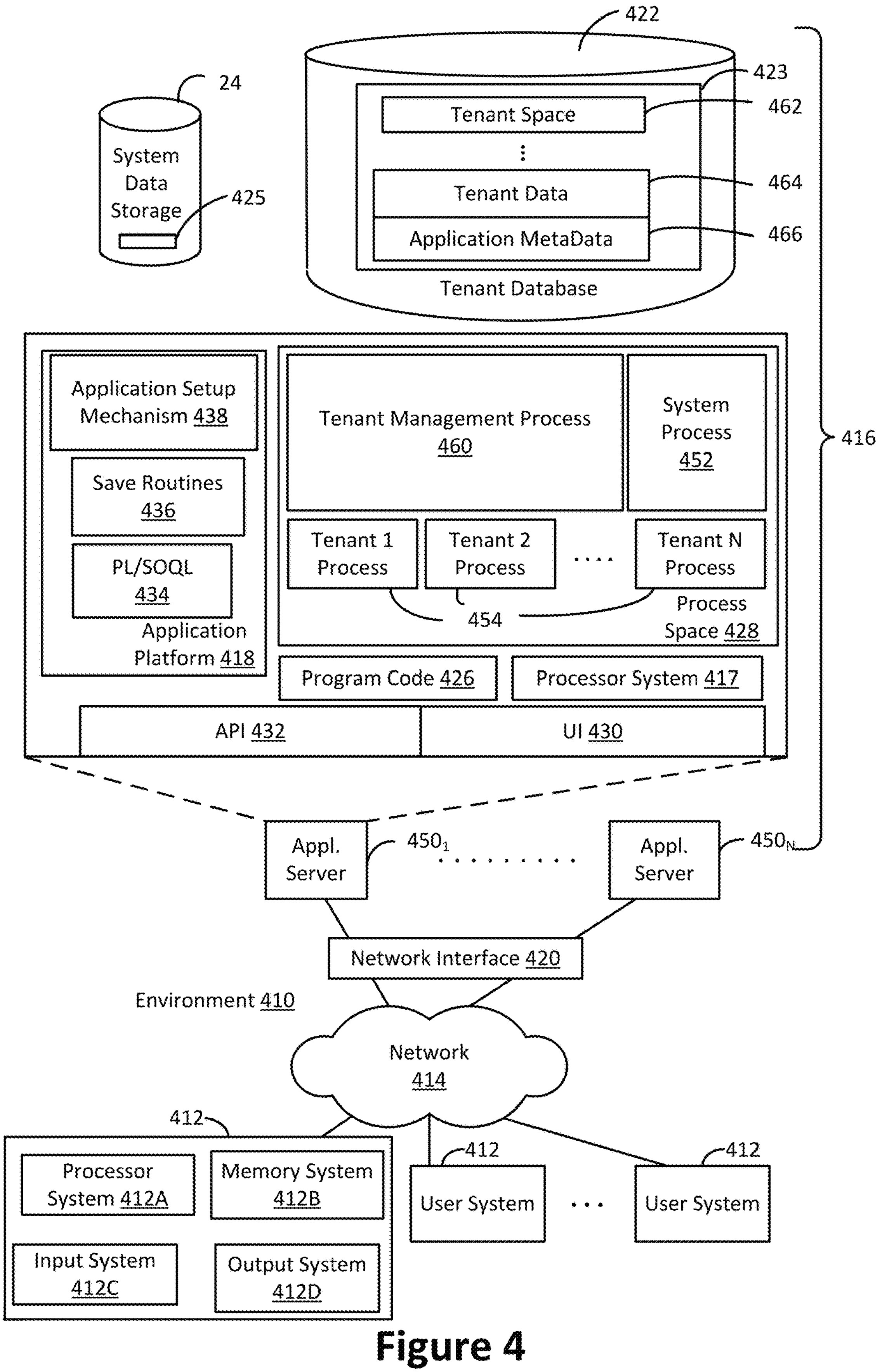
FIG. 4 shows a block diagram of an example of an environment that includes an on-demand database service configured in accordance with some implementations.

FIG. 4 shows a block diagram of an example of an environment 410 that includes an on-demand database service configured in accordance with some implementations. Environment 410 may include user systems 412, network 414, database system 416, processor system 417, application platform 418, network interface 420, tenant data storage 422, tenant data 423, system data storage 424, system data 425, program code 426, process space 428, User Interface (UI) 430, Application Program Interface (API) 432, PL/SOQL 434, save routines 436, application setup mechanism 438, application servers 450-1 through 450-N, system process space 452, tenant process spaces 454, tenant management process space 460, tenant storage space 462, user storage 464, and application metadata 466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 418 may be a framework that allows the creation, management, and execution of applications in system 416. Such applications may be developed by the database service provider or by users or third-party application developers accessing the service. Application platform 418 includes an application setup mechanism 438 that supports application developers' creation and management of applications, which may be saved as metadata into tenant data storage 422 by save routines 436 for execution by subscribers as one or more tenant process spaces 454 managed by tenant management process 460 for example. Invocations to such applications may be coded using PL/SOQL 434 that provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 466 for a subscriber making such an invocation. Such system processes may also manage execution of application metadata 466 as an application in a virtual machine.

In some implementations, each application server 450 may handle requests for any user associated with any organization. A load balancing function (e.g., an F5 Big-IP load balancer) may distribute requests to the application servers 450 based on an algorithm such as least-connections, round robin, observed response time, etc. Each application server 450 may be configured to communicate with tenant data storage 422 and the tenant data 423 therein, and system data storage 424 and the system data 425 therein to serve requests of user systems 412. The tenant data 423 may be divided into individual tenant storage spaces 462, which may be either a physical arrangement and/or a logical arrangement of data. Within each tenant storage space 462, user storage 464 and application metadata 466 may be similarly allocated for each user. For example, a copy of a user's most recently used (MRU) items might be stored to user storage 464. Similarly, a copy of MRU items for an entire tenant organization may be stored to tenant storage space 462. A UI 430 provides a user interface and an API 432 provides an application programming interface to system 416 resident processes to users and/or developers at user systems 412.

System 416 may implement a web-based entity name canonicalization system. For example, in some implementations, system 416 may include application servers configured to implement and execute entity name canonicalization software applications. The application servers may be configured to provide related data, code, forms, web pages and other information to and from user systems 412. Additionally, the application servers may be configured to store information to, and retrieve information from a database system. Such information may include related data, objects, and/or Webpage content. With a multi-tenant system, data for multiple tenants may be stored in the same physical database object in tenant data storage 422, however, tenant data may be arranged in the storage medium(s) of tenant data storage 422 so that data of one tenant is kept logically separate from that of other tenants. In such a scheme, one tenant may not access another tenant's data, unless such data is expressly shared.

Several elements in the system shown in FIG. 4 include conventional, well-known elements that are explained only briefly here. For example, user system 412 may include processor system 412A, memory system 412B, input system 412C, and output system 412D. A user system 412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 412 to access, process and view information, pages and applications available from system 416 over network 414. Network 414 may be any network or combination of networks of devices that communicate with one another, such as any one or any combination of a LAN (local area network), WAN (wide area network), wireless network, or other appropriate configuration.

The users of user systems 412 may differ in their respective capacities, and the capacity of a particular user system 412 to access information may be determined at least in part by "permissions" of the particular user system 412. As discussed herein, permissions generally govern access to computing resources such as data objects, components, and other entities of a computing system, such as an entity name canonicalization system, a social networking system, and/or a CRM database system. "Permission sets" generally refer to groups of permissions that may be assigned to users of such a computing environment. For instance, the assignments of users and permission sets may be stored in one or more databases of System 416. Thus, users may receive permission to access certain resources. A permission server in an on-demand database service environment may store criteria data regarding the types of users and permission sets to assign to each other. For example, a computing device may provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users may gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein may provide scalable, reliable, and efficient mechanisms for a developer to create tools that manage a user's permissions across various sets of access controls and across types of users. Administrators who use this tooling may effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 416 may provide on-demand database service to user systems 412 using an MTS arrangement. By way of example, one tenant organization may be a company that employs a sales force where each salesperson uses system 416 to manage their sales process. Thus, a user in such an organization may maintain contact data, leads data, customer follow-up data, performance data, goals and progress data, etc., all applicable to that user's personal sales process (e.g., in tenant data storage 422). In this arrangement, a user may manage his or her sales efforts and cycles from a variety of devices, since relevant data and applications to interact with (e.g., access, view, modify, report, transmit, calculate, etc.) such data may be maintained and accessed by any user system 412 having network access.

When implemented in an MTS arrangement, system 416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 416 may also maintain system-level data usable by multiple tenants or other data. Such system-level data may include industry reports, news, postings, and the like that are sharable between tenant organizations.

In some implementations, user systems 412 may be client systems communicating with application servers 450 to request and update system-level and tenant-level data from system 416. By way of example, user systems 412 may send one or more queries requesting data of a database maintained in tenant data storage 422 and/or system data storage 424. An application server 450 of system 416 may automatically generate one or more SQL statements (e.g., one or more SQL queries) that are designed to access the requested data. System data storage 424 may generate query plans to access the requested data from the database.

The database systems described herein may be used for a variety of database applications. By way of example, each database may generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 5A:
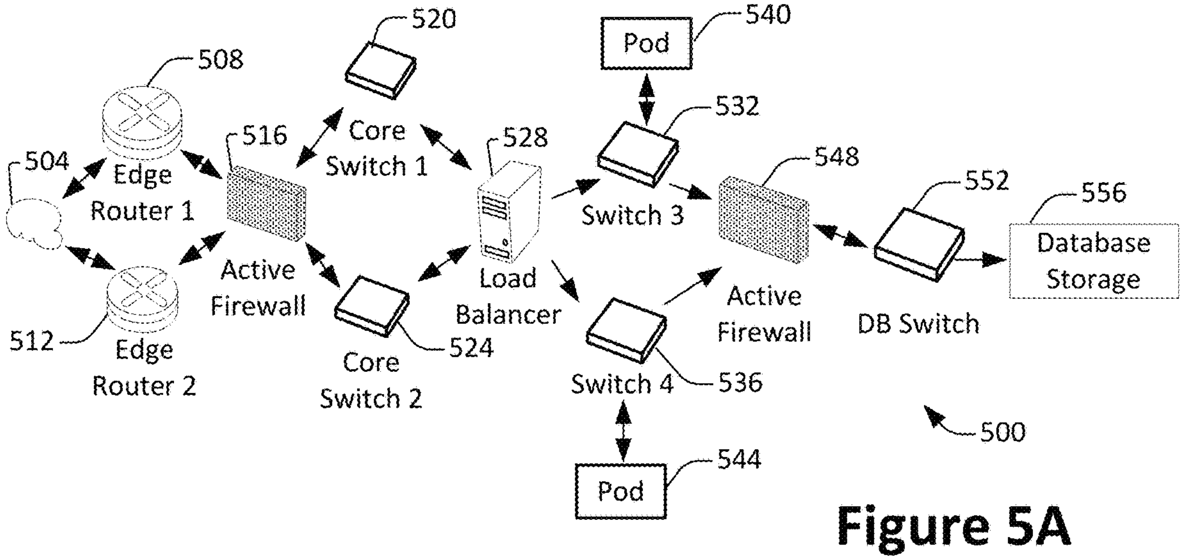
FIG. 5A shows a system diagram of an example of architectural components of an on-demand database service environment, configured in accordance with some implementations.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine may include any of the examples of user systems 412 described above. The edge routers 508 and 512 may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services.

Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 5A and 5B.

The cloud 504 refers to any suitable data network or combination of data networks, which may include the Internet. Client machines located in the cloud 504 may communicate with the on-demand database service environment 500 to access services provided by the on-demand database service environment 500. By way of example, client machines may access the on-demand database service environment 500 to retrieve, store, edit, and/or process entity name information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and/or other criteria. The firewall 516 may act as one or more of a packet filter, an application gateway, a stateful filter, a proxy server, or any other type of firewall.

In some implementations, the core switches 520 and 524 may be high-capacity switches that transfer packets within the environment 500. The core switches 520 and 524 may be configured as network bridges that quickly route data between different components within the on-demand database service environment. The use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also or alternatively, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 may be an on-demand database system shared by many different organizations. The on-demand database service may employ a single-tenant approach, a multi-tenant approach, a virtualized approach, or any other type of database approach. Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
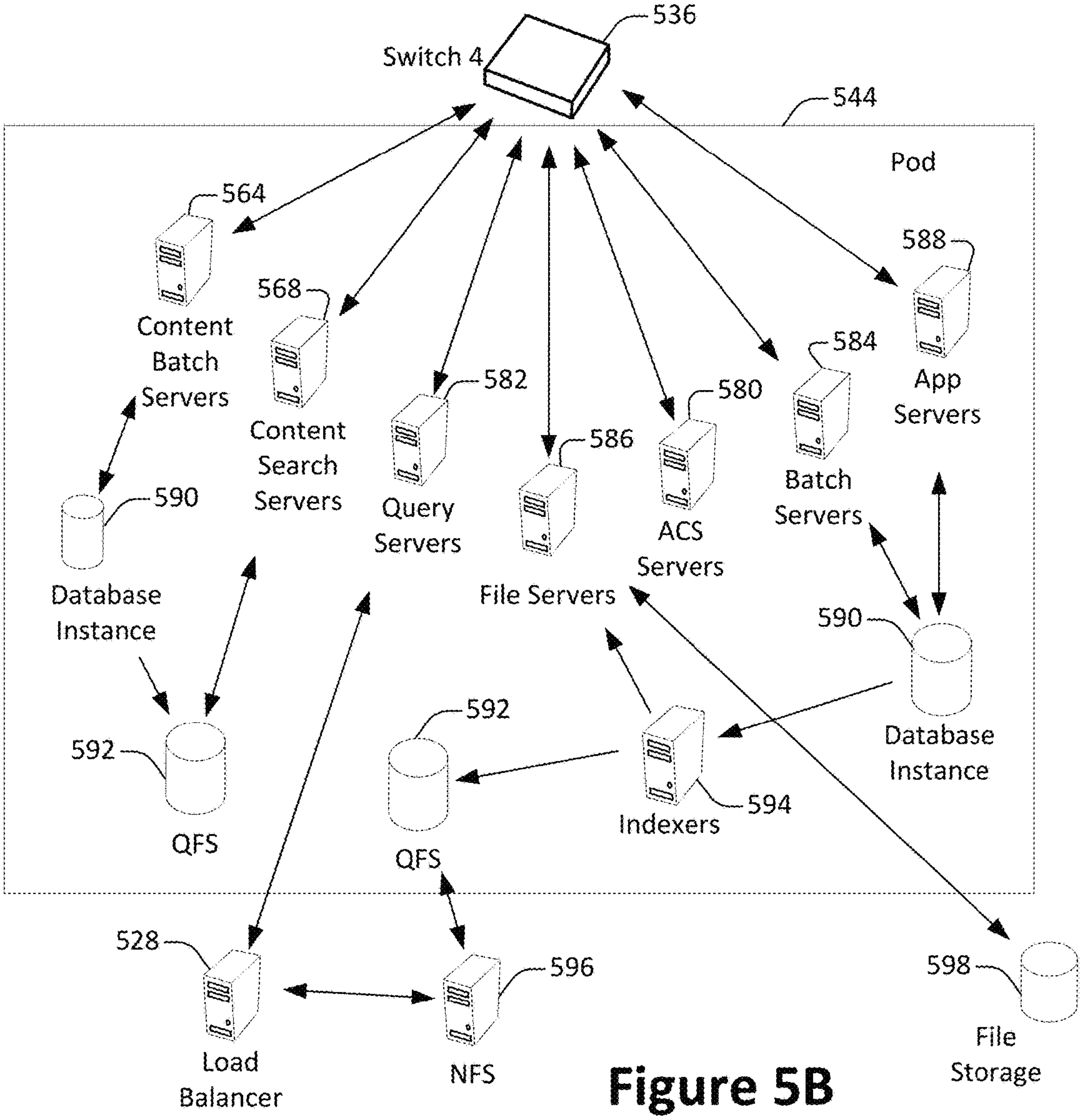
FIG. 5B shows a system diagram further illustrating an example of architectural components of an on-demand database service environment, in accordance with some implementations.

FIG. 5B shows a system diagram further illustrating an example of architectural components of an on-demand database service environment, in accordance with some implementations. The pod 544 may be used to render services to user(s) of the on-demand database service environment 500. The pod 544 may include one or more content batch servers 564, content search servers 568, query servers 582, file servers 586, access control system (ACS) servers 580, batch servers 584, and app servers 588. Also, the pod 544 may include database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, as discussed above, the pod 544 may include one or more database instances 590. A database instance 590 may be configured as an MTS in which different organizations share access to the same database, using the techniques described above. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS 592 may communicate with the database instances 590, content search servers 568 and/or indexers 594 to identify, retrieve, move, and/or update data stored in the network file systems (NFS) 596 and/or other storage systems.

In some implementations, one or more query servers 582 may communicate with the NFS 596 to retrieve and/or update information stored outside of the pod 544. The NFS 596 may allow servers located in the pod 544 to access information over a network in a manner similar to how local storage is accessed. Queries from the query servers 522 may be transmitted to the NFS 596 via the load balancer 528, which may distribute resource requests over various resources available in the on-demand database service environment 500. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod 544. These requests may be long-running and/or not tied to a particular customer, such as requests related to log mining, cleanup work, and maintenance tasks. The content search servers 568 may provide query and indexer functions such as functions allowing users to search through content stored in the on-demand database service environment 500. The file servers 586 may manage requests for information stored in the file storage 598, which may store information such as documents, images, basic large objects (BLOBs), etc. The query servers 582 may be used to retrieve information from one or more file systems. For example, the query system 582 may receive requests for information from the app servers 588 and then transmit information queries to the NFS 596 located outside the pod 544. The ACS servers 580 may control access to data, hardware resources, or software resources called upon to render services provided by the pod 544. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2© by IBM and the like without departing from the scope of present disclosure.

Figure 6:
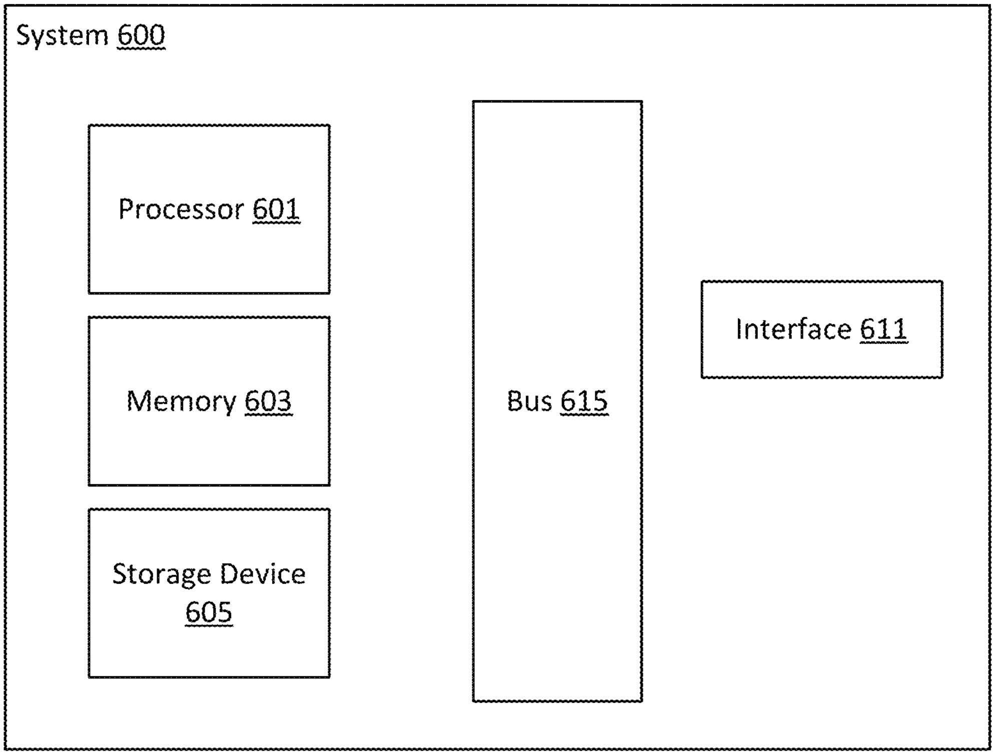
FIG. 6 shows one example of a computing device, in accordance with some implementations.

FIG. 6 illustrates one example of a computing device, in accordance with some implementations. According to various embodiments, a system 600 suitable for causing and/or implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices may also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but may use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Some implementations may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method comprising:

preprocessing, using a computing system implemented via a database system, a plurality of entity name variations gathered from a plurality of sources, the preprocessing comprising at least one of cleaning, normalizing, tokenizing, removing stop words, expanding abbreviations, or correcting misspellings;

transforming the preprocessed entity name variations into vector representations using a word embedding model;

storing the vector representations in a vector database of the database system, wherein the vector database is optimized to store and index vector data for similarity-based retrieval;

clustering, based on a similarity metric between the vector representations, the entity name variations into groups of similar entity name variations using an unsupervised clustering algorithm, wherein the clustering discovers the groups from the vector representations without reference to a pre-existing entity name list or pre-assigned canonical identifiers, and wherein the canonical identifier for each group is generated based on the entity name variations within the group; and generating and storing in the database system a canonical identifier for each group of similar entity name variations, each canonical identifier identifying a distinct entity.

2. The method of claim 1, wherein the entity name variations are further enriched with contextual metadata including: source information, timestamp, location.

3. The method of claim 2, wherein clustering the entity names into groups is further based on the contextual metadata.

4. The method of claim 1, wherein processing the plurality of entity name variations includes: removing special characters and correcting errors, before transforming the entity name variations into vector representations.

5. The method of claim 1, wherein transforming the entity name variations into vector representations comprises applying Word2Vec or GloVe to convert the entity name variations into numerical vectors.

6. The method of claim 1, wherein the similarity metric includes a cosine similarity metric comprising a normalized dot product between vectors representations.

7. The method of claim 1, wherein clustering the entity names into groups comprises applying a clustering algorithm.

8. The method of claim 7, wherein the clustering algorithm comprises k-means, DBSCAN, or hierarchical clustering.

9. The method of claim 8, wherein a number of clusters into which the entity name variations are grouped is automatically determined by the clustering algorithm.

10. The method of claim 8, wherein a number of clusters into which the entity name variations are grouped is user definable.

11. The method of claim 1, wherein the database is a vector database optimized for performing similarity searches in high-dimensional spaces.

12. A computing platform implemented using a server system, the computing platform being configurable to cause:

preprocessing, using a computing system implemented via a database system, a plurality of entity name variations gathered from a plurality of sources, the preprocessing comprising at least one of cleaning, normalizing, tokenizing, removing stop words, expanding abbreviations, or correcting misspellings;

transforming the preprocessed entity name variations into vector representations using a word embedding model;

storing the vector representations in a vector database of the database system, wherein the vector database is optimized to store and index vector data for similarity-based retrieval;

clustering, based on a similarity metric between the vector representations, the entity name variations into groups of similar entity name variations using an unsupervised clustering algorithm, wherein the clustering discovers the groups from the vector representations without reference to a pre-existing entity name list or pre-assigned canonical identifiers, and wherein the canonical identifier for each group is generated based on the entity name variations within the group; and generating and storing in the database system a canonical identifier for each group of similar entity name variations, each canonical identifier identifying a distinct entity.

13. A computer program product comprising non-transitory computer-readable program code capable of being executed by one or more processors when retrieved from a non-transitory computer-readable medium, the program code comprising instructions configurable to cause the one or more processors to perform a method comprising:

preprocessing, using a computing system implemented via a database system, a plurality of entity name variations gathered from a plurality of sources, the preprocessing comprising at least one of cleaning, normalizing, tokenizing, removing stop words, expanding abbreviations, or correcting misspellings;

transforming the preprocessed entity name variations into vector representations using a word embedding model;

storing the vector representations in a vector database of the database system, wherein the vector database is optimized to store and index vector data for similarity-based retrieval;

clustering, based on a similarity metric between the vector representations, the entity name variations into groups of similar entity name variations using an unsupervised clustering algorithm, wherein the clustering discovers the groups from the vector representations without reference to a pre-existing entity name list or pre-assigned canonical identifiers, and wherein the canonical identifier for each group is generated based on the entity name variations within the group; and generating and storing in the database system a canonical identifier for each group of similar entity name variations, each canonical identifier identifying a distinct entity.

14. The method of claim 1, wherein a number of the groups into which the entity name variations are clustered is automatically determined by the unsupervised clustering algorithm.

15. The method of claim 1, wherein the clustering comprises: assigning two entity name variations to a same group only if a cosine similarity between their respective vector representations exceeds a predefined threshold.

16. The method of claim 1, wherein the word embedding model is trained on multilingual text data or domain-specific text data.

17. The method of claim 1, further comprising:

resolving an ambiguous abbreviation shared by two distinct entities by using geographic metadata associated with the entity name variations to assign the ambiguous abbreviation to a correct one of the two distinct entities during the clustering.

18. The method of claim 2, wherein the contextual metadata resolves ambiguities between entity name variations having similar vector representations but referring to distinct entities.

19. The method of claim 1, further comprising: enhancing the clustering with continuous learning by periodically retraining the word embedding model based on newly gathered entity name variations to generate updated vector representations, wherein the clustering utilizes the updated vector representations to adapt to new abbreviations, synonyms, or emerging trends in entity names.

20. The method of claim 1, wherein a number of the groups into which the entity name variations are clustered is automatically determined by the unsupervised clustering algorithm.

* * * * *